Nov. 26, 1935.  G. J. SEISS  2,022,388

ELECTRIC SWITCH

Filed May 17, 1934

Inventor
George J. Seiss
By Faust G. Crampton
Attorney

Patented Nov. 26, 1935

2,022,388

UNITED STATES PATENT OFFICE 2,022,388

ELECTRIC SWITCH

George J. Seiss, Toledo, Ohio

Application May 17, 1934, Serial No. 726,015

3 Claims. (Cl. 200—52)

My invention has for its object to provide a readily constructed electric switch that is efficient and convenient for closing circuits. It is so constructed as to be particularly useful in connection with a member having a handle for manipulation of an instrument that also requires the manipulation of a switch. Thus, the invention may be used for controlling the circuit of an electric sound signal or a light signal or any other electrically operated device.

The invention also has for its object to provide a structure that may be made at a low cost in commercial production, both as to material and as to assembly of the parts.

The invention may be contained in structures of different forms and to illustrate a practical application of the invention, I have selected the switch illustrated in the accompanying drawing as a particular example of various embodiments of my invention. The structure selected may be varied without departing from the spirit of the invention.

Figure 1:
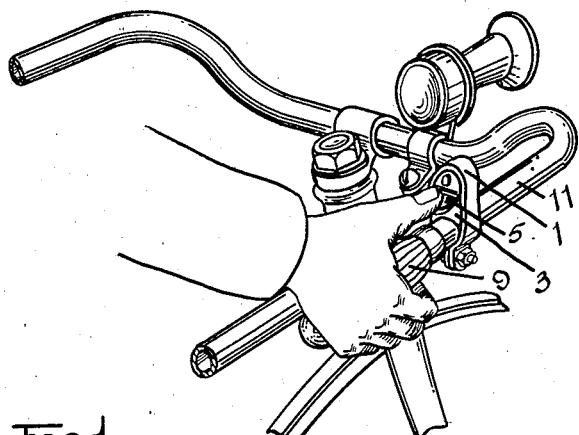
Figure 2:
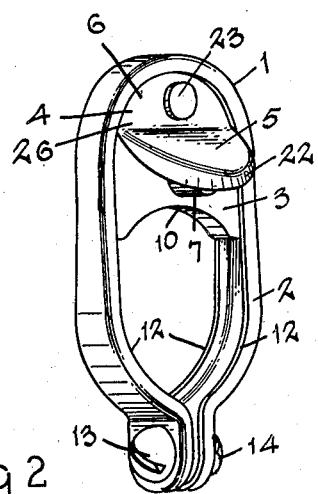
Figure 3:
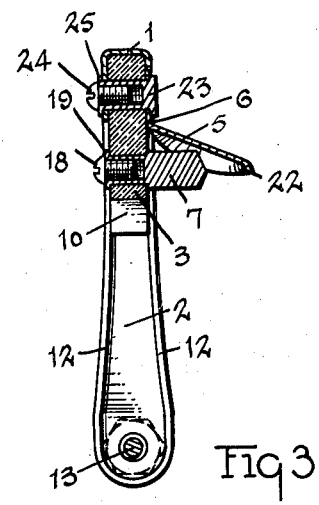

Fig. 1 is a perspective view of a bicycle handle bar and the switch mounted thereon and illustrates a specific use to which the invention may be put. Fig. 2 is a perspective view of the switch. Fig. 3 is a view of a section taken on a plane extending through the major dimension of the switch.

The switch 1 is formed for mounting on a bar. It may be mounted in proximity to the handle of the steering bar of a bicycle, and so that the handle may be readily grasped in the palm of the user, and the thumb will be located in position for ready manipulation of the switch substantially as illustrated in Fig. 1.

The switch comprises a sheet metal strip 2, an electric insulating block 3, and plate 4 having a part 5 that is formed to rigidly maintain its shape without deformation, but which is elastically and integrally connected to a part 6 which is secured to the insulating block 3 and capable of deflection at the juncture of the parts 5 and 6 to make contact with the terminal 7, also mounted on the block 3. The strip 2 is formed channel-wise to render it rigid in construction and to enclose the upper and side edges of the block 3. Preferably, the strip 2 is formed loop-shape, and the upper and side edges of the block 3 are formed arcuate, and the dimensions are such that when the block 3 is inserted in the channel of the strip 2 and disposed within the upper end of the loop, the block 3 will be tightly clamped by the sides and top of the strip 2 when the ends of the strip are drawn towards each other. The lower end of the block 3 is formed to have a reentrant, curved edge 10 that corresponds in its curvature substantially to that of the bar 11 to which it may be connected. The channeled loop 2 is provided with curved edges 12 that coact with the central points or lines of the curved edge 10 to wedgedly engage the bar 11 when the ends of the strip 2 are drawn towards each other, such as by the screw bolt 13 and the nut 14.

When thus clamped in position, the block 3 is securely held in position and so as to locate the block 3 above the bar 11 and in position for ready manual operation of the switch, while the hand may be retained on the handle 9 for steering and manipulation of the bicycle.

The terminal 7 of the switch is made in the form of a post and is secured to the block 3 by riveting or upsetting the end of the post as at 19. The screw 18 affords a binding post for connecting a wire to the terminal 7. Above the post or terminal 7 is located in inclined relation to the surface of the block 3 the part 5, which is formed to have the flange 22 that extends around the edge of the part 5 and operates to render the part 5 rigid as well as to hood the post or terminal 7 and prevent rain or moisture from short-circuiting between the terminal 7 and the part 5. The flange 22 prevents flexing of the part 5 at any point within its area.

The part 6, that is formed integrally with the part 5 from the plate 4, extends in a plane inclined to part 5 and is located on the surface of the block 3. It is secured by the rivet stud 23. The screw 24 is threaded into the stud 23 as at 25 and forms the second binding post for connecting the switch in an electric circuit.

The plate 4 is formed of elastic sheet metal, and the resiliency of the bend at 26 alone operates to yieldingly resist depression of the part 5 of the plate so as to make contact with the post or terminal 7. The part 5 thus forms a broad finger piece. The plate 4 has considerable width, and, consequently, the sharp bend at the juncture of the parts 5 and 6 is of considerable length and affords a sturdy elastic portion for normally maintaining the part 5 in displaced relation with respect to the terminal 7. Thus, the part 5 of the plate 4 affords an exceedingly convenient push button of considerable area for closing and opening the switch by manual manipulation, such as by the use of the thumb.

I claim:

1. In a switch, an insulating block, a plate having two rigidly formed parts located in inclined relation to each other and connected integrally by an elastic bend extending across the plate, one of the parts secured to the block, and the other part disposed in inclined relation with respect to the block, a terminal post secured in the block and located below the part inclined to the block, said last named part having a flange depending therefrom and surrounding the end of the post for preventing deformation of the said last named part, a channeled strip bent in the form of a loop, the said block located within the channel of the said loop and in one end of the said loop, a member for supporting the said block, and means for clamping the ends of the strip to draw the block against the member for securing the switch to the supporting member.

2. In a switch, a channeled metal strip bent in the form of a loop, an insulating switch supporting plate having edge portions along its three edges corresponding to the shape of the looped strip and substantially fitting and located in the channel of the said strip, switch parts supported on and protruding from the sides of the said insulating switch plate, a supporting member for supporting the said strip and the said insulating switch plate, and means for clamping the ends of the looped strip to draw the remaining edge of the switch plate against the member for securing the switch plate to the supporting member to locate the planes of the sides of the plate substantially at right angles to the surface of the member at the point of connection of the switch with the member.

3. In a switch and insulating plate, a metal plate having two rigidly formed parts forming an obtuse angle to each other and connected integrally by an elastic bent portion extending across the said metal plate, one of the parts secured to the insulating plate to locate the elastic bent portion of the metal plate across the insulating plate and the other disposed in an inclined relation to the said insulating plate, a terminal stud secured in the insulating plate and located below the part of the metal plate inclined to the insulating plate, the said inclined part of the metal plate having an edge part for preventing deformation of the said last-named part, a channeled metal strip bent in the form of a loop, the said insulating plate having edge portions conforming to a one-end part of the loop and located in the said end of the loop, the said metal plate located in the channel and engaged by the said metal strip, a member for supporting the said switch, and means for clamping the ends of the said strip to draw the said insulating plate against the member for securing the switch to the supporting member and means for electrically connecting the switch in a circuit.

GEORGE J. SEISS.